UNITED STATES PATENT OFFICE 2,101,374

CHOCOLATE MALTED MILK FOOD PRODUCT AND PROCESS OF FORMING SAME

Martha E. Tucker, Grand Rapids, Mich.

No Drawing. Application August 19, 1937,
Serial No. 159,963

2 Claims. (Cl. 99—27)

The invention relates to a food product, the formula and process of preparing the same.

Objects of the invention are as follows:

*First.*—To provide a sterilized, canned, chocolate malted milk food product containing all of the ingredients necessary to make a commercial chocolate malted milk drink, and at the same time hold all of the ingredients in stable uniform dispersion throughout the product, which will be smooth, creamy and homogeneous, tasty, and a balanced finished product that will eliminate noticeable cooked milk taste, condensed milk flavor or a so-called canned milk or process taste.

*Second.*—To provide a sterilized, canned, chocolate malted milk food product that when placed in commercial so-called counter freezers or mixers and the temperature brought down to 26° F. to 30° F. will freeze to a uniform chocolate malted milk drink with excellent flavor and a good consistency and at the same time whip or yield 100 percent, the same as commercial ice cream mix. In other words, if 50 fluid ounces are placed in the mixer, 100 fluid ounces can be dispensed to the trade.

*Third.*—To provide a sterilized, canned food product, for use as a cold chocolate malted milk drink in the home, by first cooling the product in the can, (and to approximate the flavor of the drink frozen in a so-called counter mixer with 100 percent whip or yield), add to the product equal portions of cold milk. This product is readily soluble in milk and if the portion of milk is placed in the container first, and then the product added, the result is nearly instant solubility. This is caused by the difference of the specific gravities of the milk and the sterilized canned food product.

*Fourth.*—To provide a sterilized canned food product for use as a hot chocolate malted milk drink in the home, by merely adding equal portions of fresh milk to the product and heating the same to the desired temperature short of boiling temperature, to make a palatable hot chocolate malted milk drink.

*Fifth.*—To provide a sterilized, canned, food product, for use as a chocolate malted milk ice cream topping, in the home or commercially for the topping of so-called ice cream sundaes, by merely pouring a desired portion of the product direct from the can onto the ice cream.

*Sixth.*—To provide a sterilized, canned chocolate malted milk food product to be used as one of the ingredients for the preparation of various food recipes, such as chocolate malted milk fudge, cake frosting, puddings, frozen desserts, etc.

*Seventh.*—To provide a sterilized chocolate malted milk food product that is homogenized, which makes the product in a pre-digested state, combining such approved products as butter fat, milk or serum solids, malted milk, chocolate, seasoning and a stabilizer into several minute particles that give healthful and nourishing food to babies and invalids.

The principal features of this sterilized chocolate malted milk food product are, its sterility, its homogenity, excellent taste and flavor, and the fact that all of the ingredients are held in stable suspension, including the cocoa or chocolate, so that they do not separate when left standing, and at all times this sterilized canned food product is stable, smooth and homogeneous.

This food product contains cream, skimmed milk concentrate, malted milk powder, or malt powder or malt liquor or combination of the same, powdered cocoa, or chocolate, sugar, salt, water, and a stabilizer such as a starch, several commercial products as Cocosol or Cocoloid. The illustrative following formula for a 100 pound batch shows Cocoloid being used, a sodium alginate product.

100 pound batch of sterilized chocolate malted milk mix

| Ingredients | Weight | Percent butter fat | Percent whey not solids | Percent serum solids | Percent other solids | Percent total solids |
|---|---|---|---|---|---|---|
| 11 lbs. raw cream (37% butter fat; 5% serum solids) | 11 lb. 0 oz. | 4.07 | 6.38 not solids | .55 | | 4.62 |
| 14½ lb. skimmed milk concentrate (30% serum solids) | 14 lb. 8 oz. | | 10.15 not solids | 4.35 | | 4.35 |
| 5 lb. a malted milk powder containing 8% butter fat and 7.5% serum soilds | 5 lb. 0 oz. | .40 | | .38 | 4.22 | 5.00 |
| 12 lb. Canner's cane sugar | 12 lb. 0 oz. | | | | 12.00 | 12.00 |
| 2½ lb. powdered cocoa | 2 lb. 8 oz. | | | | 2.50 | 2.50 |
| 3 oz. Canner's salt | 3 oz. | | | | .1875 | .1875 |
| 4 oz. Cocoloid (a commercial product of sodium alginate) | 4 oz. | | | | .2500 | .2500 |
| Water | 54 lb. 9 oz. | | | | | |
| Totals | 100 lb. 0 oz. | 4.47 | 16.53 not solids | 5.28 | 19.1575 | 28.9075 |

The above ingredients are used to give a balanced finished product that will eliminate a noticeable cooked milk taste, a condensed milk flavor or a so-called canned milk or process taste. This is accomplished in the following manner. Fresh milk from the cow contains from 3½ percent to 4 percent butter fat and about 7½ percent serum solids and the balance, milk water, known as whey. The serum solids and the whey direct from the cow when cooked to a sterilizing heat give a cooked taste.

It is necessary to have some percentage more serum solids than butter fat in order to balance the product and also to give body to the product. The serum or milk solids cannot be eliminated and some other agent added and still call the product milk.

To obtain at least 4 percent of butter fat in the completed product, the above table shows that 11 pounds of 37 percent butter fat cream is used. Now in order to reduce the serum solids from the objectionable 7.5 percent serum solids of ordinary milk, 14½ pounds of 30 percent serum solids of skimmed milk concentrate is used. This leaves in the finished product only 16.53 percent of whey, 10.15 percent having been added with the milk concentrate and 6.38 percent having been added with the cream, the balance of the liquid of the complete 100 pound batch being water. By reducing both the serum solids and the whey when the product has been subjected to a sterilizing heat, there is no noticeable cooked or canned milk process taste. The stabilizer used in the above formula is a sodium alginate product commercially known as "Cocoloid". This product will not retard sterilizing heat, its duty being to aid in holding the ingredients in suspension. It will not hold back heat as do starches. After the completed product is whipped to 100 percent yield, the sodium alginate will act as a gelatin to hold the whipped product stable. It will not degenerate at a sterilizing heat as high as 250° F. Gelatin will not stand more than 212° F. before it degenerates. Other stabilizers such as various starches, or starch product such as commercially known "Cocosol", can be used but best results were had with "Cocoloid" for reasons above stated.

Process

First mix all of the dry ingredients of the above formula together—sugar, salt, Cocoloid, malted milk and cocoa, adding the malted milk and cocoa last so that the other ingredients will absorb the moisture that may be in the malted milk and cocoa and help keep the dry ingredients free of lumps. Then heat the lactic fluid (cream and milk concentrate) and water to 165° F. in a stainless steel, steam jacketed kettle, and add the dry ingredients slowly so as not to allow the temperature to go lower than 160° F. at any time, because it takes that temperature to dissolve the Cocoloid in the dry ingredients.

Then heat the batch to from 190 degrees to 200 degrees F. in order to flow the starches in the malted milk and cocoa with substantial agitation to promote thorough dissolving of the ingredients, but not boil. The aforementioned steam jacketed kettle should be marked for a complete 100 pound batch so that water at 200° F. can be added to that mark to take care of evaporation during the pre-cook. Then homogenize or viscolize the batch at above 190° F. (starch flowing temperature) at approximately 2000 pounds per square inch. Fill in 2¼ inch diameter cans at a closing temperature of not less than 170° F. Then place the cans immediately in a retort or autoclave and subject to a temperature of 240° F. for 70 minutes, with a still cook. Smaller diameter cans will not require so long a cook, however 2¼ inch diameter cans are the largest recommended to be used, as a longer cook is injurious to the product. Cool immediately and then agitate the sterilized product with a commercial corn shaker or other mechanical device for a minute or two in order to recluster the previously homogenized particles that were partly separated by the intense sterilizing heat. The resulting product will therefore be smooth and homogeneous.

In order to preserve the better taste of finished product, as above stated, stainless steel steam jacketed kettles should be used during the pre-cook and the piping the product runs through in the course of manufacture should also be stainless steel, with sanitary fittings, couplings, etc. The homogenizer or viscolizer should be an approved dairy type.

This product has been incubated in laboratories at two different temperatures for two week periods in each temperature, (98° F. and 130° F.) and then brought to normal temperature and tested for bacteria and other germs, and it was found to be void of all germs. Also after incubation the product was still stable, smooth and homogeneous, and of excellent taste.

What is claimed is:

1. A method of making a sterilized chocolate flavored malted milk food product, including mixing cream, milk concentrate, cocoa, malted milk, a stabilizer, and water, proportioning the ingredients so that the ratio of serum solids to butter fat is slightly in excess of one, heating the mixture to a temperature between 190° F. and 200° F. to cause the starches of the cocoa and malted milk to flow, homogenizing the mixture at the starch flowing temperature, and sterilizing the mixture.

2. A method of making a sterilized chocolate flavored malted milk food product, including mixing cream, milk concentrate, chocolate, malt, a stabilizer, and water in an amount substantially greater than the whey of the cream and milk concentrate, proportioning the ingredients so that the ratio of serum solids to butter fat is slightly in excess of one, heating the mixture to a temperature between 190° F. and 200° F. to cause the starches of the chocolate and malt to flow, homogenizing the mixture at the starch flowing temperature, and sterilizing the mixture.

MARTHA E. TUCKER.